May 30, 1939.  H. L. TURNEY  2,160,447
POWER DRIVE
Filed May 2, 1935   3 Sheets-Sheet 1

INVENTOR.
Harry L Turney
BY
H McLeod
ATTORNEYS.

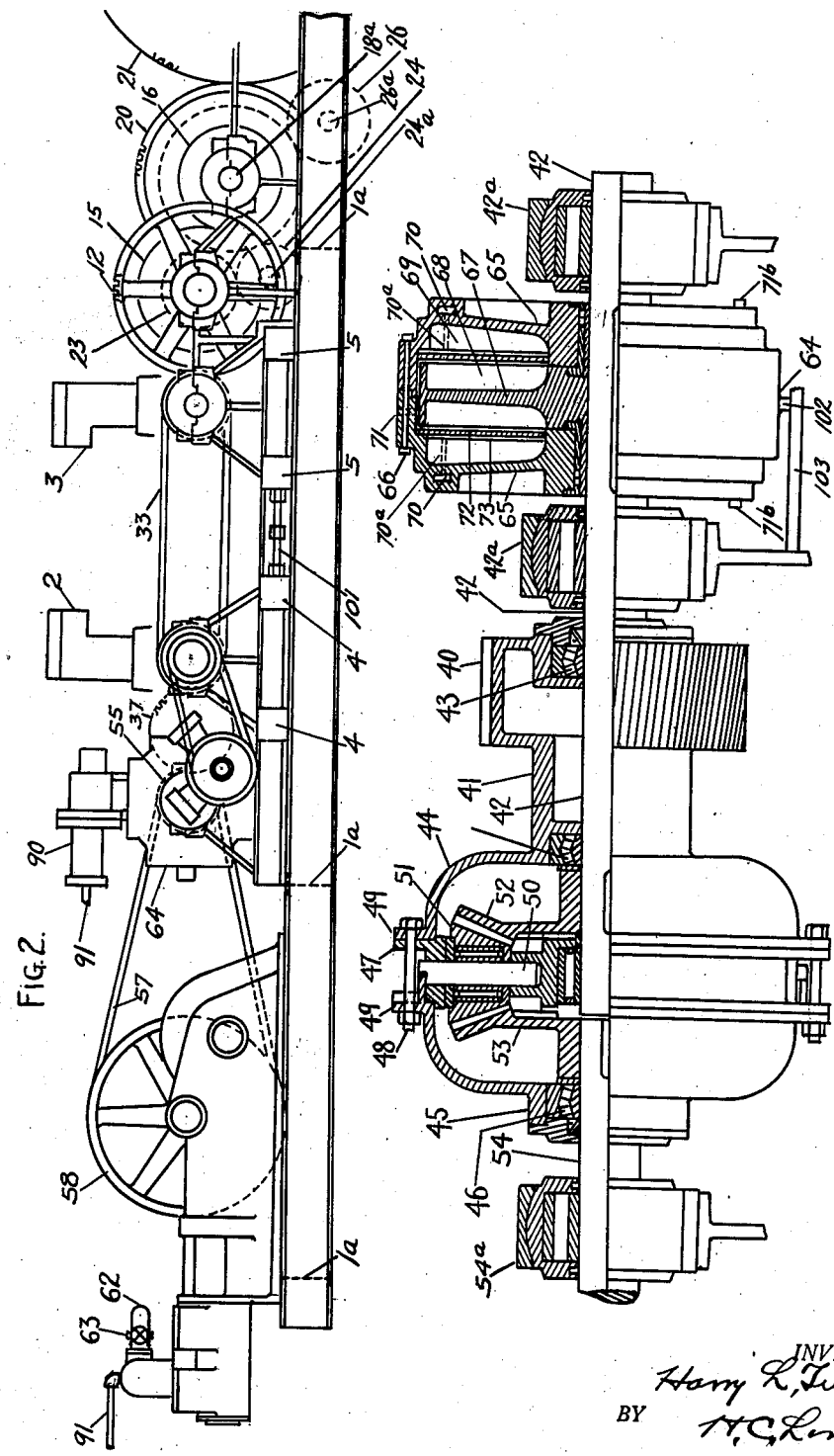

May 30, 1939.  H. L. TURNEY  2,160,447
POWER DRIVE
Filed May 2, 1935  3 Sheets-Sheet 3

INVENTOR.
Harry L. Turney
BY
ATTORNEYS.

Patented May 30, 1939

2,160,447

UNITED STATES PATENT OFFICE 2,160,447

POWER DRIVE

Harry L. Turney, Los Angeles, Calif., assignor to Patents & Royalties Corporation, Los Angeles, Calif., a corporation of California Application May 2, 1935, Serial No. 19,419

3 Claims. (Cl. 103—35)

The present invention is directed to power drives. It is of particular advantage in driving apparatus such as pumps which require a continuous active driving force and in some instances at a very reduced speed. The power drive of the invention is of particular advantage when the prime mover, or motor, is an internal combustion engine of some type which is only efficient above certain minimum speeds.

The invention is exemplified as driving the pumps ordinarily used in connection with rotary drills, particularly in connection with such drills when used for drilling deep wells, such as oil wells. With this drilling operation, water or mud is continuously circulated through the bit and is returned to the surface carrying with it the cuttings of the drill. It is not unusual in this operation for a stoppage of the circulation passage to occur and under these conditions tremendous pressures are built up on the system, particularly if powerful engines are used, these pressures in some instances being sufficient to wreck the apparatus. Heretofore it has been common to drive such pumps with steam as a driving fluid and such pumps can be readily controlled and efficiently operated at any speed and in consequence there is a follow-up and continuous pressure delivered even though there is an almost complete stoppage of the circulating system. With motors which are not well adapted in themselves to give this follow-up pressure at slow speeds various expedients have been tried to maintain pressure when there is a partial, or complete stoppage. This has been accomplished in some instances by trapping mud in the line and bypassing the fluid via a sump back to the pump. This permits a continuous operation of the pump, but it does not give an effective follow-up pressure to the circulating passages. Another attempted solution involves the use of high pressure relief valves, but these devices have not been entirely satisfactory. In some cases where fluid pressure from the pump is used for cementing jobs in the well it is very desirable to maintain full high pressure with practically no circulation. Here again difficulty has been experienced with other than steam pumps in giving the follow-up action to maintain these high pressures with very little movement, or discharge of the pumps.

With the present invention this difficulty is entirely corrected in a comparatively simple manner by providing a slip drive between the pumps and the motor. Preferably this is effected by driving the pumps through a differential gear, the pumps being arranged at one take-off of the gear and the opposite take-off of the gear being subjected to a variable brake, preferably a water brake. In carrying the invention forward means are provided for automatically varying the water brake in response to the mud line pressure and preferably also means are provided for setting the pressure that may be automatically maintained by the apparatus. In this way full pressure is assured to the predetermined degree of pressure to which the apparatus may be adjusted and at the same time danger of over-loading the pump is obviated. The invention also contemplates a more effective hook-up of the engine with the apparatus generally used with deep well set works. Features and details of the invention will appear from the specification and claims.

A preferred embodiment of the invention is illustrated in the accompanying drawings as follows:—

Fig. 2 is an elevation of the apparatus.

Fig. 3 is an enlarged section of the differential and water brake on the line 3—3 in Fig. 1.

Figure 1:
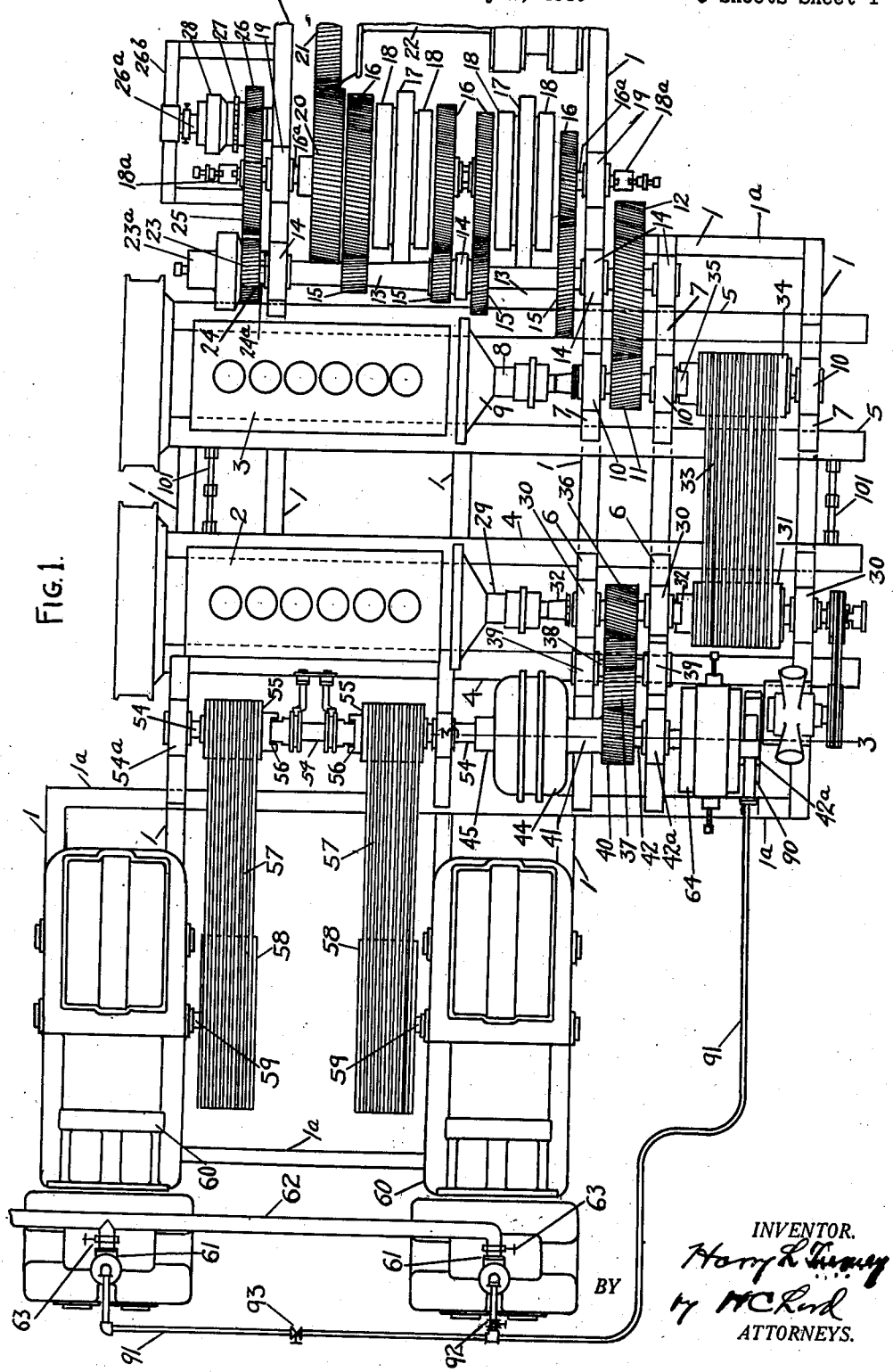
Fig. 1 shows a plan view of the apparatus associated with a drilling set works.

The sub-frame of the apparatus is made up of longitudinal girders 1 and cross girders 1a. Engines 2 and 3 are mounted on skid frames 4, 4 and 5, 5. These skid frames are adapted to be moved across the sub-frame as units on which the engines are mounted. These skid frames 4, 4 and 5, 5 are connected by cross members 6 and 7 respectively. The motor 3 has a power take-off shaft 8 which is controlled by a clutch 9. The shaft 8 is mounted in bearings 10, these bearings being mounted on the cross members 7. A gear 11 is fixed on the shaft 8 and meshes with a gear 12. The gear 12 is fixed on a pinion shaft 13. The shaft 13 is journaled in bearings 14 mounted on extensions 1b of the longitudinal girders. Transmission gears 15 are fixed on the shaft 13 and these gears mesh gears 16 journaled on a transmission shaft 16a. The shaft 16a is journaled in bearings 19. Drivers 17 are fixed on the shaft 16a and are arranged between pairs of the gears 16. Clutches 18 connect the drivers 17 with the gears, the selection being made through air-actuated means by way of nozzles 18a. A gear 20 is fixed on the shaft 16a and meshes with a gear 21. The gear 21 is connected through a clutch mechanism (not shown) with a hoisting drum 22. A reverse gear 23 is journaled on the shaft 13 and is controlled by a clutch 23a with which it may be fixed with the shaft 13. The gear 23 meshes with an idling gear 24 carried beneath by a shaft 24a and the idling gear 24 meshes with a gear 25 fixed on the transmission at 16a. A gear 26 is fixed on a shaft 26a below gear 25 and meshes with 25. The shaft 26a is carried by a bracket 26b. A sprocket 27 is journaled on the shaft 26a and is adapted to be fixed with the shaft by a clutch 28. With this mechanism the drum may be operated through the transmission gears for operating the cable. It may be reversed through the gear mechanism, if desired, and the sprocket 27 may be driven at will from the gearing as described and the sprocket 27 may be operated in either direction for operating a drill table. A shaft 29 forms the take-off for the engine 2 and the shaft 29 is journaled in bearings 30 carried by the cross members 6. A pulley 31 is mounted on the shaft 29 and adapted to be locked with the shaft by a clutch 32. V-belts 33 communicate the motion of the pulley 31 to a pulley 34 mounted on the shaft 8. A clutch 35 is adapted to lock the pulley 34 with the shaft 8. In this way both engines 2 and 3 may be utilized for operating the hoist 22, if desired.

A gear 36 is fixed on the shaft 29 and meshes with a gear 37. The gear 37 is fixed on a shaft 38 and the shaft is mounted in bearings 39 on the cross members 6.

The gear 37 meshes with a gear 40. The gear 40 is fixed on a sleeve 41. The sleeve 41 is journaled on a shaft 42 by means of roller bearings 43 (see Fig. 3). The sleeve 41 extends from a housing 44 of a differential. The opposite side of the housing terminates in a sleeve 45 which is journaled through a roller bearing 46 (Fig. 3) on a shaft 54. A ring 47 is clamped between flanges 49 by bolts 48. Stub shafts 50 extend from the ring 47 into the housing and differential pinions 51 are journaled on the shafts 50. The pinions 51 mesh with opposing gears 52 and 53 which are fixed on the shafts 42 and 54 respectively, these shafts forming the power take-off from the differential.

Pulleys 55 are journaled on the shaft 54 and are adapted to be locked with the shaft by clutches 56. Belts 57 convey the movement of the pulleys 55 to pulleys 58.

The pulleys 58 are fixed on shafts 59. The shafts 59 are arranged to drive mud pumps 60. They are of the ordinary reciprocating type and have discharge pipes 61 leading to a pipe 62 which pipe ordinarily leads to the drill stem. Valves 63 are provided so that the discharge from either pump may be cut off and a single pump utilized, if desired.

A water brake 64 is arranged on the shaft 42. This brake is in some respects of ordinary construction (Fig. 3). It has a casing 65 which is made in halves, the halves being secured together by bolts 66. A rotor 67 is fixed on the shaft 42. The rotor is provided with the usual water brake blades 68 which operate in conjunction with blades 69 arranged in the case, or stator. Water is delivered to annular passages 70 in the case from a supply pipe 71b and is delivered to the brake chamber through passages 70a and water is discharged through a passage 71. The purpose of the circulation of water through the brake is to permit of the cooling of the water by any suitable means (not shown).

Figure 5:
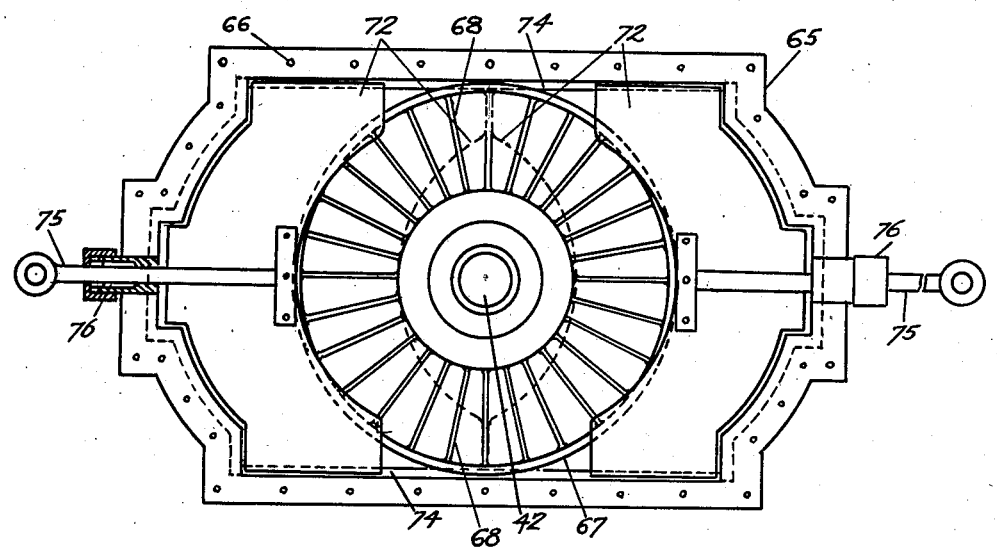
Fig. 5 is a view of the water brake, a side of the brake being removed to better show construction.

Spaces 73 are provided between the edges of the blades 68 and 69 and gates 72 are slidingly mounted in guides 74 provided in the case. Rods 75 extend through the gates through stuffing boxes 76. (See Fig. 5.)

The retarding effect of the water brake is varied by adjusting these gates. As they are moved to their outer position a greater area of the opposing pockets in the rotor and stator are exposed and a greater resistance is given to the movement of the rotor. As the gates are closed and this opposed area is reduced the resistance offered by the brake is also reduced.

Figure 4:
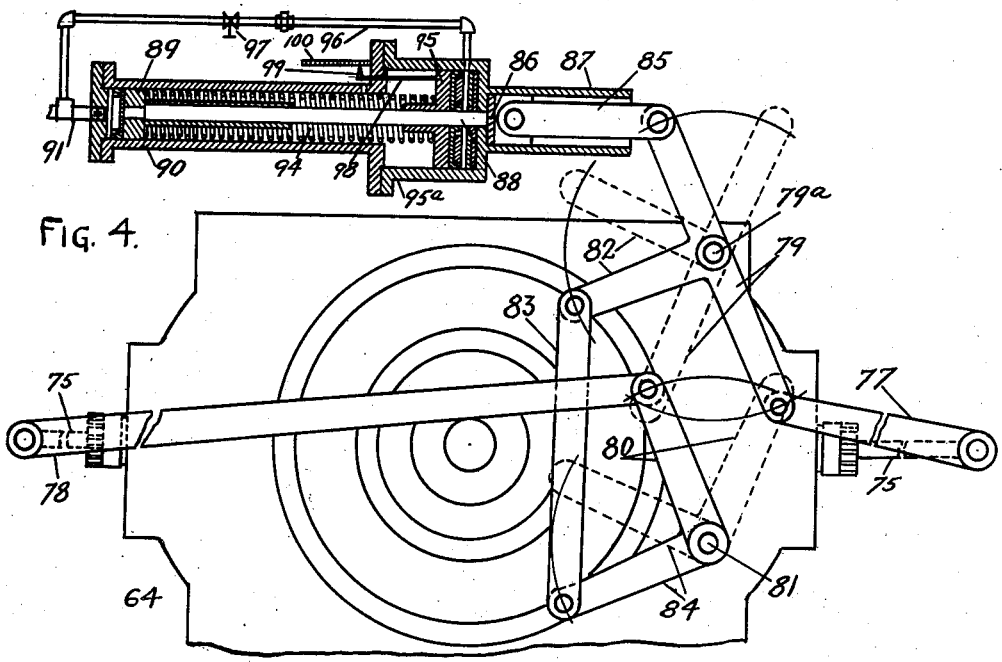
Fig. 4 is an elevation of the water control mechanism, a part being in section.

In order to adjust the gates I have provided a simple mechanism as follows (Fig. 4): The outer ends of the rods 75 are connected by links 77 and 78 with levers 79 and 80 respectively. The lever 79 is journaled on a pin 79a on the case. The lever 80 is journaled on a pin 81 on the case. An arm 82 extends from the lever 79 and is connected by a link 83 with an arm 84 extending from the lever 80. By following this lever scheme it will be noted that reverse movements are given to the links 77 and consequently to the rods 75 so that both gates are opened, or closed simultaneously by the action of the lever 79.

It will be noted that as the driving ring of the differential is driven the shaft 54 communicates movement to the pumps and the power that is delivered to the pumps through this shaft is dependent on the resistance which is maintained on the shaft 42 by the water brake. This resistance may be adjusted and consequently the delivery by the pumps definitely controlled through the water brake without changing the speed of the driving motor. Thus a slip drive is provided of rugged construction and one that may be readily controlled so far as any heat factors are concerned so that any desired pressure may be maintained by the pumps from no strokes to full strokes of the pumps and this will be a follow-up pressure determined by the water brake.

I prefer to control these gates and consequently the resistance of the brake automatically in response to variations of the fluid pressure coming from the pumps. This is accomplished by the following mechanism (Fig. 4): A link 85 extends from the lever 79 to a cross head 86 mounted in a guide 87. A rod 88 extends from the cross head 86 to a piston 89. The piston is slidingly mounted in a cylinder 90. A pipe 91 extends from the cylinder 90 to the discharge pipes 61 on the pumps. Valves 92 and 93 are provided in the connections leading from the pipe 91 to the discharge pipe 61 permitting of a connection to both pumps, or a selective cutting out of either pump from the pipe 91. A spring 94 opposes the movement of the piston 89 and is of a strength giving the desired resistance to the piston 89 to require the pre-determined pressure in the pipe 91 coming from the pumps to move the piston and consequently vary the position of the gates and the resistance of the water brake.

It may be desirable to change the pre-determined pressure as delivered by the pump and this is accomplished as follows: A piston 95 is slidingly mounted on the rod and arranged in a cylinder 95a slightly larger than the cylinder 90. A pipe 96 connects the cylinder 95a with the pipe 91 and by reason of the larger area of the piston 95 exerts sufficient pressure on that piston to operate the piston against the spring 94 when there is operative pressure on the piston 89. A rod 98 extends from the piston 95 and terminates in an indicating finger 99 which traverses a scale 100. A controlling valve 97 is provided in the pipe 96 so that the fluid may be admitted back of the piston 95 and the piston moved to any point desired as indicated by the scale so as to adjust the mechanism to maintain any pre-determined pressure on the mud line that may be desired.

It will be seen therefore, that with any pre-determined pressure setting the operator is relieved of any anxiety as to any building-up of injurious pressures, or any anxiety as to the maintenance of the desired pressure and that this pre-determined, or desired pressure may be changed at will through the operation of the piston 95 through the control valve 97. The control valve may be placed at any desired position, ordinarily at the control position of the entire rig.

In order that the belt 33 may be maintained in working tension the shaft 42 is mounted in bearings 42a and the shaft 54 in bearings 54a and these bearings are mounted on the same frame as the engine 2, the cross members 6 being extended for this purpose. The frame made up of the girders 4 and cross members 6 is slidingly mounted on the longitudinal girders 1 and jacks 101 are provided by means of which the frame carrying the engine 2 and the shafts 42 and 54 may be moved to adjust the belt 33 and this is accomplished without disturbing the driving connection between the engine 2 and the shaft 42. It will be understood that the pumps will be similarly adjusted on a sliding base for tightening their belts.

Water brake housing 64 (Fig. 3) is prevented from rotating by stop 102 which bears on any suitable portion 103 provided in the general framework.

What I claim as new is:

1. In a power drive, the combination of a differential gear having a driving element and differential take-off elements driven by the driving element; means driving the driving element; a fluid pump driven by one of the take-off elements; a variable resistance water brake on the other take-off element; and means responsive to pressure of the fluid pumped varying the brake resistance.

2. In a power drive, the combination of a differential gear having a driving element and differential take-off elements driven by the driving element; means driving the driving element; a power delivering means driven by one take-off element; a pump driven by the power delivering means; a water brake having a rotor and stator with blades spaced axially; said rotor being driven by the other differential take-off element; a gate device varying the water transfer area; and means responsive to pressure of the pumped fluid adjusting the device.

3. In a power drive, the combination of a differential gear having a driving element and differential take-off elements driven by the driving element; means driving the driving element; a fluid pump driven by one of the take-off elements; a variable resistance water brake on the other take-off element; means responsive to pressure of the fluid pumped varying the brake resistance; and manually controlled devices varying the pressure responsive means.

HARRY L. TURNEY.